United States Patent
Yoshida et al.

(10) Patent No.: US 10,490,189 B2
(45) Date of Patent: Nov. 26, 2019

(54) SUPPORT SYSTEM, SUPPORT METHOD, AND MEMORY MEDIUM

(71) Applicant: Kabushiki Kaisha Toshiba, Tokyo (JP)

(72) Inventors: Takami Yoshida, Kawasaki Kanagawa (JP); Kenji Iwata, Machida Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/904,210

(22) Filed: Feb. 23, 2018

(65) Prior Publication Data

US 2019/0147866 A1 May 16, 2019

(30) Foreign Application Priority Data

Nov. 15, 2017 (JP) ................................ 2017-220054

(51) Int. Cl.
  G10L 15/22 (2006.01)
  G10L 15/28 (2013.01)
  G06F 16/332 (2019.01)
  G06F 17/27 (2006.01)

(52) U.S. Cl.
  CPC .......... *G10L 15/22* (2013.01); *G06F 16/3329* (2019.01); *G10L 15/28* (2013.01); *G06F 17/279* (2013.01)

(58) Field of Classification Search
  CPC .......... G10L 15/22; G10L 15/28; G10L 17/22; G10L 15/08; G10L 2015/0635; G10L 15/063
  See application file for complete search history.

(56) References Cited

U.S. PATENT DOCUMENTS

| | | | | |
|---|---|---|---|---|
| 5,404,295 A | * | 4/1995 | Katz | G06F 17/241 704/9 |
| 5,963,902 A | * | 10/1999 | Wang | G06K 9/6226 704/240 |
| 6,553,365 B1 | * | 4/2003 | Summerlin | G06F 17/2785 707/740 |
| 8,027,457 B1 | * | 9/2011 | Coy | H04M 3/4936 379/265.01 |
| 8,185,539 B1 | * | 5/2012 | Bhardwaj | G06F 17/30985 707/756 |
| 9,471,887 B2 | | 10/2016 | Shin et al. | |
| 9,812,127 B1 | * | 11/2017 | Perez | G06F 17/279 |
| 9,886,953 B2 | * | 2/2018 | Lemay | G10L 15/28 |

(Continued)

FOREIGN PATENT DOCUMENTS

| | | |
|---|---|---|
| JP | 4769005 | 9/2011 |
| JP | 2012-247948 | 12/2012 |

(Continued)

*Primary Examiner* — Mohammad K Islam

(74) *Attorney, Agent, or Firm* — Knobbe, Martens, Olson & Bear, LLP

(57) ABSTRACT

According to one embodiment, a support system is for adding a new slot parameter for use in a dialogue system. The support system includes an acquiring unit and a first processing unit. The acquiring unit is configured to acquire a new slot parameter to be added to the dialogue system. The first processing unit is configured to transmit first information that includes the new slot parameter to an operator of the dialogue system, based on a first evaluation value for selecting the new slot parameter.

13 Claims, 9 Drawing Sheets

(56) References Cited

U.S. PATENT DOCUMENTS

| | | | |
|---|---|---|---|
| 2003/0125945 A1* | 7/2003 | Doyle | G10L 15/01 704/246 |
| 2006/0149555 A1* | 7/2006 | Fabbrizio | G10L 15/22 704/275 |
| 2008/0317239 A1* | 12/2008 | Gilzean | H04M 1/274566 379/221.08 |
| 2010/0228843 A1* | 9/2010 | Ok | H04L 12/66 709/223 |
| 2014/0309993 A1* | 10/2014 | Goussard | G10L 15/063 704/231 |
| 2015/0227890 A1* | 8/2015 | Bednarek | G06Q 10/08355 705/26.81 |
| 2015/0228004 A1* | 8/2015 | Bednarek | G06Q 30/0633 705/26.8 |
| 2018/0054464 A1* | 2/2018 | Zhang | H04L 51/04 |
| 2018/0226068 A1* | 8/2018 | Hall | G06F 17/2705 |
| 2018/0293221 A1* | 10/2018 | Finkelstein | G06F 17/2705 |
| 2018/0374479 A1* | 12/2018 | Hall | G10L 15/1822 |

FOREIGN PATENT DOCUMENTS

| | | |
|---|---|---|
| JP | 2017-505964 | 2/2017 |
| JP | 6088091 | 3/2017 |

* cited by examiner

SUPPORT SYSTEM, SUPPORT METHOD, AND MEMORY MEDIUM

CROSS-REFERENCE TO RELATED APPLICATIONS

This application is based upon and claims the benefit of priority from Japanese Patent Application No. 2017-220054, filed on Nov. 15, 2017; the entire contents of which are incorporated herein by reference.

FIELD

Embodiments described herein relate generally to a support system, a support method, and a memory medium.

BACKGROUND

A dialogue system in which, for example, a user's voice is recognized, and response text is generated is mentioned as one method of providing information to a user. Another method is to provide a service that a user desires from character information input by the user. It is desirable that operation of the service providing system be simple.

DETAILED DESCRIPTION

Figure 1:
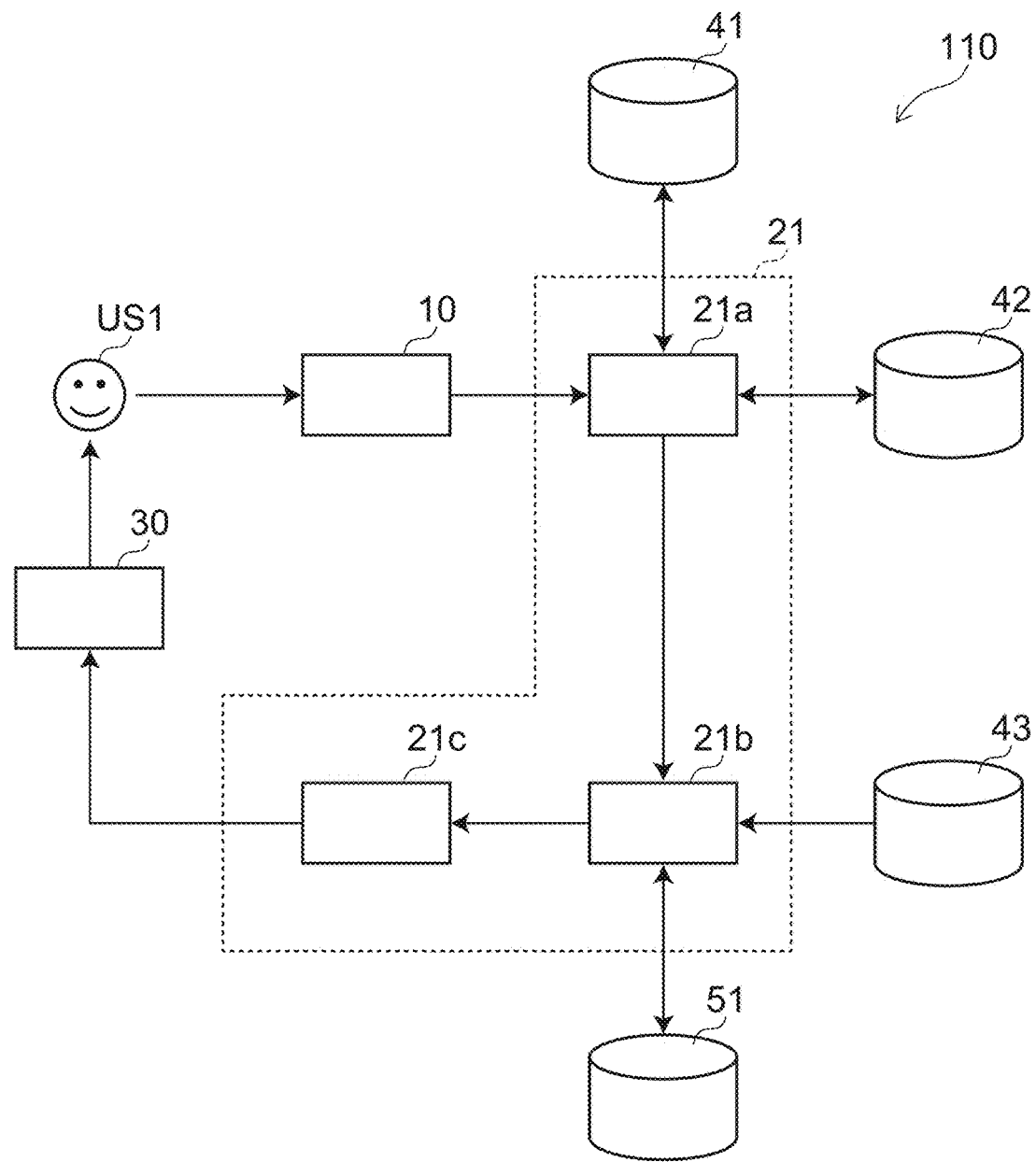
FIG. 1 is a schematic view illustrating a support system according to a first embodiment.

According to one embodiment, a support system is for adding a new slot parameter for use in a dialogue system. The support system includes an acquiring unit and a first processing unit. The acquiring unit is configured to acquire a new slot parameter to be added to the dialogue system. The first processing unit is configured to transmit first information that includes the new slot parameter to an operator of the dialogue system, based on a first evaluation value for selecting the new slot parameter. FIG. 1 is a schematic view illustrating a support system according to a first embodiment.

As illustrated in FIG. 1, a support system 110 includes an acquiring unit 10 and a first processing unit 21. The acquiring unit 10 acquires information. The first processing unit 21 carries out processing on the information. The support system 110, for example, supports the operation of a service providing system that provides services to users.

In the following, first, an example of a service providing system will be described.

Figure 2:
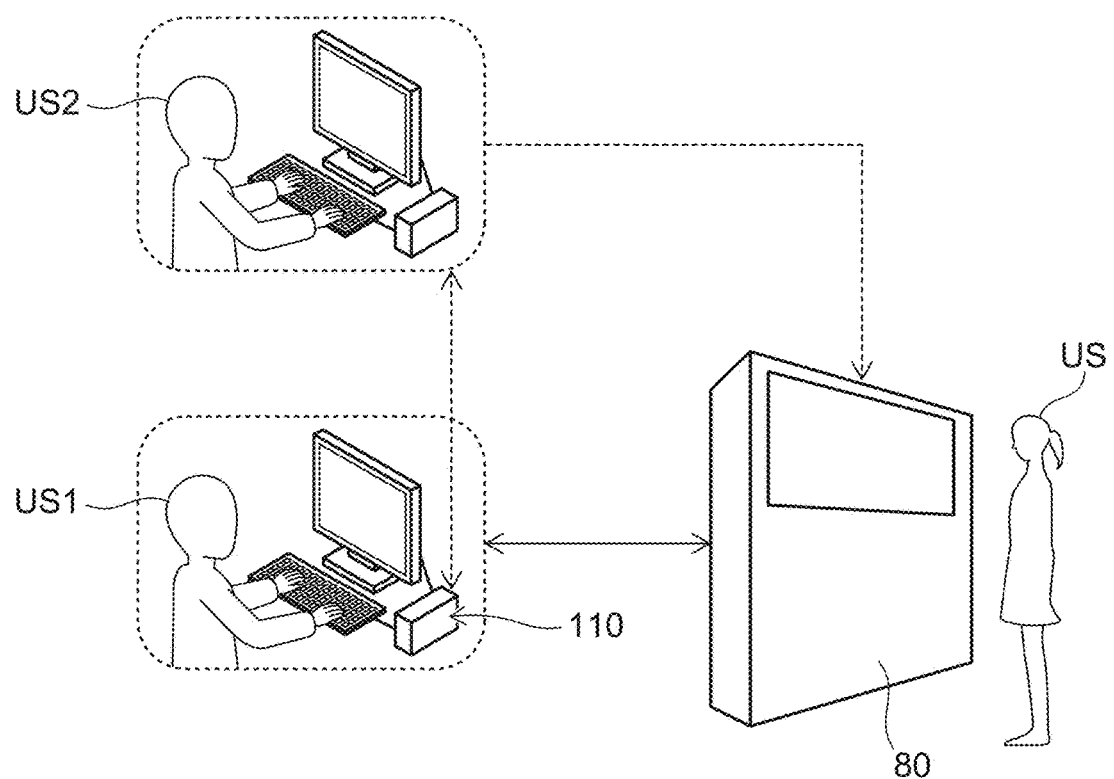
FIG. 2 is a schematic view illustrating a service providing system, to which a support system according to a first embodiment is applied.

FIG. 2 is a schematic view illustrating a service providing system, to which a support system according to a first embodiment is applied.

A service providing system 80 includes, for example, a dialogue system. The service providing system 80 recognizes voice produced by a user US, and generates response text. The service providing system 80 infers intentions of the user US by interacting with the user US through recognizing the voice and generating the response text. The service providing system 80 may infer the intentions of the user US by receiving, for example, character information from the user US. The service providing system 80 provides the user US with services (information desired by the user US and the like), in accordance with the inferred intention of the user US.

For example, the service providing system 80 is installed in a shopping mall. In a shopping mall, there are a plurality of restaurants, a plurality of toy stores, a plurality of clothes shops, and the like. A user US who visits such a shopping mall asks the service providing system 80 various "inquiries", for example, by voice. The service (information) is provided to the user US by the service providing system 80 in accordance with such "inquiries".

For example, in one example in which a user US wants to have a meal, the user US knows the name of the restaurant that the user US wants to go to, but does not know the location. In this case, the user US vocalizes the name of the restaurant. The service providing system 80 carries out voice recognition of the vocalization, and tells the user US the information regarding the location of the restaurant. For example, the location of the restaurant is provided as information (service).

On the other hand, there are cases where the user US only knows the outline of what the user US wants, but does not know the specific name of the store. In such a case also, it is desirable that appropriate information (suggestions) can be provided. For example, in some cases, the user US will vocalize "Japanese food", and in the other cases, the user US just vocalizes "Japanese-style". Appropriate information (service) can be provided by understanding the intention of such ambiguous vocalization.

For example, a plurality of "classifications" in which information can be stored is provided in the service providing system 80, so that the service providing system 80 can appropriately understand the intention. One of the plurality of classifications is allocated to "restaurants". Another one of the plurality of "classifications" is, for example, allocated to other stores (services) such as "clothing stores".

A plurality of phrases (Japanese food, Korean food, Italian food, and the like) can be stored in one (restaurant) of the plurality of "classifications". For example, in a case where the "phrase" of "Japanese food" is stored in the "classification" and when the user US vocalizes "Japanese restaurant?", "Japanese food?", "Japanese-style", or "Japanese home cooking", the intention of the user US can be appropriately inferred and information regarding Japanese food in the shopping mall can be provided.

On the other hand, for example, when the user US vocalizes "Chinese food", the service providing system 80 provides information regarding Chinese food in the shopping mall.

By appropriately setting a plurality of "phrases" to be stored in the "classifications", the intention of the user US can be accurately inferred.

For example, a plurality of "phrases" stored in the "classifications" can be provided in the service providing system 80 at the design phase. Also, training may be carried out over time in accordance with results of the "dialogues" with the users US in the shopping mall.

Further, in a case where a new store is provided in the shopping mall, it is desirable that a new "phrase" corresponding to the store can be set as appropriate. For example, when there is already a "Japanese restaurant" in the shopping mall, and another "Japanese restaurant" is newly provided, a new "phrase" often may not necessarily be added. In contrast, in a case where there is no "Vietnamese restaurant" in the shopping mall, the phrase "Vietnamese food" may be newly added.

Setting a new "phrase" is carried out by a first user US1 (see FIG. 2). The user US1 is an operator of (or a worker for) the service providing system 80. The first user US1 carries out operations relating to setting a new "phrase". The first user US1 may also be an administrator of the service providing system 80. The first user US1 is, for example, an operator (or an employee) of the shopping mall or a manager (or an employee) of the store included in the shopping mall. On the other hand, the service providing system 80 is designed and sold by a second user US2, who is different from the first user US1. The second user US2 may be another administrator of the service providing system 80. For example, the "classifications" and "phrases" in the service providing system 80 are initially set by the second user US2. Then, during operation of the service providing system 80, new phrases can be set by the first user US1.

To enable a new phrase to be set by the first user US1 during operation of the service providing system 80 after the initial setting, a change in the specifications of the service providing system 80 is enabled at appropriate timings.

When the first user US1 sets a new "phrase", in a case where such a "phrase" that is to be newly set is inappropriate, the inferred intention of the user US can be inaccurate. The support system 110 according to an embodiment can infer whether the phrase is appropriate when a new phrase is being added. For example, when "Vietnamese food" is set as a new phrase, it is inferred whether there is a high possibility of appropriately inferring the intention with respect to an ambiguous "inquiry" by the user US. Also, for example, information appropriate to the situation is provided to the first user US1 or the second user US2 in accordance with an inference result.

Figure 3:
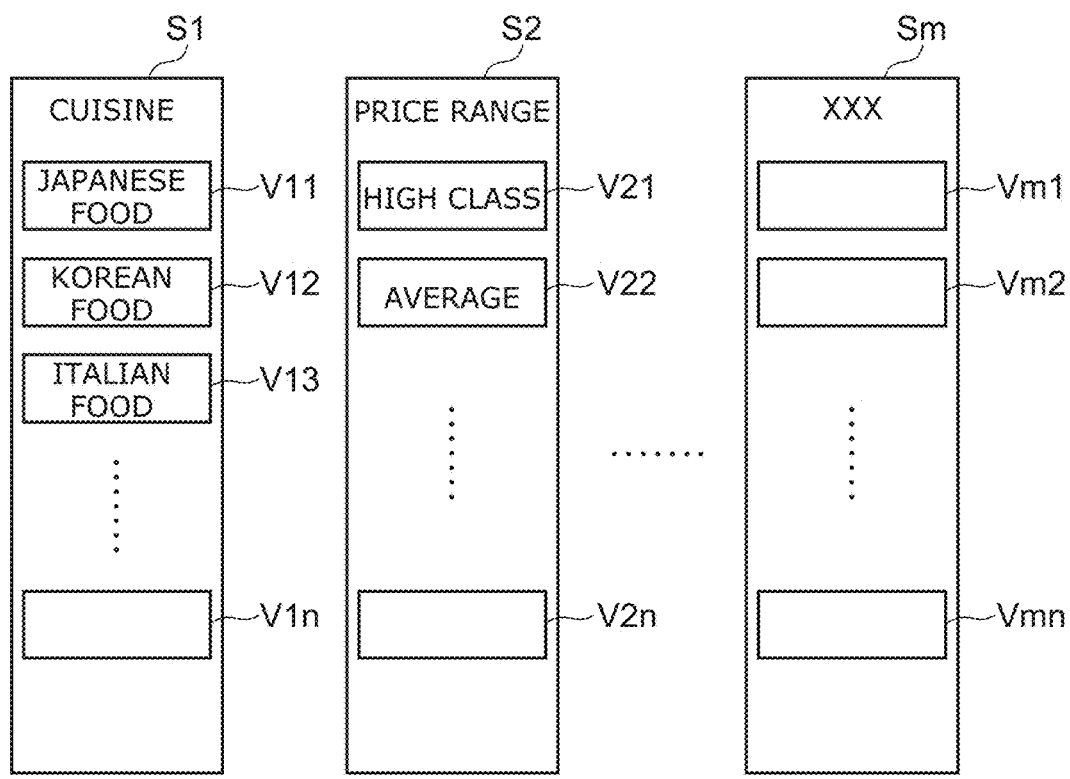
FIG. 3 illustrates slot parameters (values) and slots.

FIG. 3 illustrates slot parameters (values) and slots. When making an inference, the service providing system 80 refers to "classifications" set in advance and the "phrases" included in the "classifications". The "classifications" are referred to as slots. The "phrases" are referred to as slot parameters or values. FIG. 3 illustrates a plurality of slots S1 to Sm relating to restaurants in a shopping mall. A plurality of values is set in each of the slots. For example, a slot S1 relating to cuisine includes a value V11 relating to Japanese food, a value V12 relating to Korean food, a value V13 relating to Italian food, and the like. A slot S2 relating to price range includes a high class value V21, an average person value V22, and the like. A characteristic amount is set for each value. The service providing system 80 refers to the plurality of slots S1 to Sm, infers the value intended by the user US, and generates a response text regarding the value.

Figure 4:
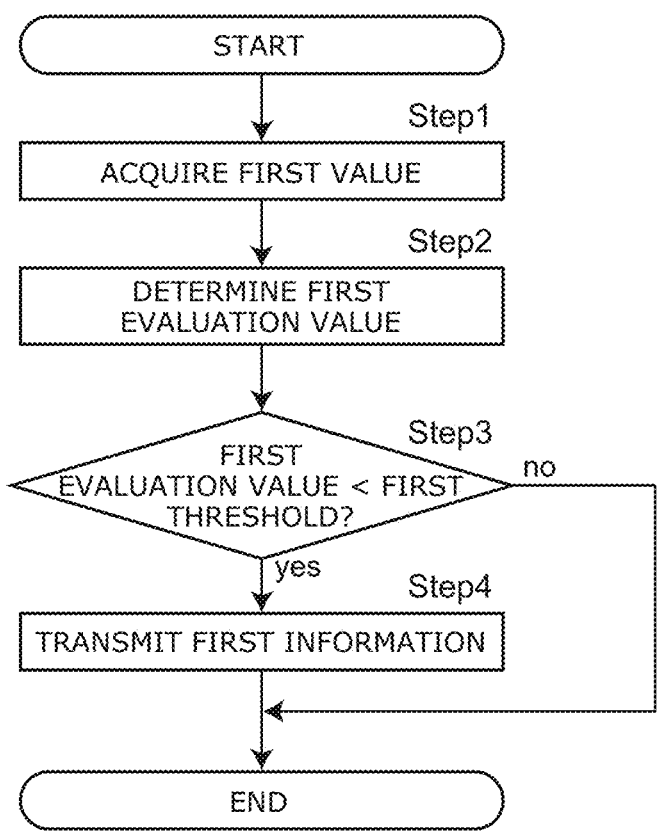
FIG. 4 is a flowchart illustrating an operation of the support system according to the first embodiment.

FIG. 4 is a flowchart illustrating an operation of the support system according to the first embodiment.

The acquiring unit 10 acquires information. The information is input by the first user US1, for example. The information includes, for example, at least one of sound information (voice information) and text information. A voice method may be input, and character information derived from the voice information may be acquired by the acquiring unit 10. The acquiring unit 10 includes, for example, at least one of a keyboard, a microphone, and a touch panel.

The first processing unit 21 processes the information acquired by the acquiring unit 10. The first processing unit 21 includes, for example, a CPU (for example, a computer or the like). The first processing unit 21 may also include a memory. For example, the acquiring unit 10 acquires a first value (first slot parameter) to be added to the first slot, based on the input by the first user US1 (Step 1).

For example, the first processing unit 21 determines a first evaluation value that represents the accuracy of an inference of the first value (Step 2). The first processing unit 21, for example, compares the first evaluation value with a threshold value that is set in advance (Step 3). When the first evaluation value is lower than the first threshold value, the first processing unit 21 transmits first information to the first user US1 (Step 4). In this case, the first processing unit 21, for example, does not add the first value to the first slot. When the first evaluation value is equal to or higher than the first threshold value, the first processing unit 21 may add the first value to the first slot. In this case, the first processing unit 21 may request an approval of the first user US1. The first processing unit 21 receives the approval of the first user US1, and adds the first value to the first slot.

The first information includes, for example, the first value and a second value (second slot parameter) different from the first value. The second value is a candidate alternative to the first value. For example, the first information includes a suggestion to the first user US1 to add the second value instead of the first value. The accuracy of an inference of the second value is higher than the accuracy of an inference of the first value. For example, the second value is determined based on the degree of similarity between the first value and the second value. The first information may include the second value and another value.

In a case where the first information is transmitted to the second user US2, the first information may further include at least one item selected from the group consisting of identification information for the dialogue system and the version of the dialogue system. The identification information is specific information for identifying the dialogue system provided to the first user US1. The version is information indicating details of the dialogue system provided to the first user US1.

The support system 110 may also include an output unit 30. The output unit 30 receives the first information, and then outputs the first information. For example, the output unit 30 serves as a monitor. In this case, the output unit 30 displays the first information. The output unit 30 may also be a speaker that outputs the first information by voice. The output unit 30 may also be a printer that prints and displays the first information.

When the first evaluation value that represents the accuracy of the inference of the first value is low, the support system 110 transmits the first information to the first user. For example, when the dialogue system receives an inquiry that includes the first value and it is inferred that an appropriate response cannot be made, the first information is transmitted to the first user. When the first evaluation value that represents the accuracy of the inference of the first value is high, the support system 110, for example, adds the first information to the first slot.

In this way, the first user US1 edits the first slot by reference to the first information. It is not necessary for the first user US1 itself to investigate the accuracy of the inference of the first value. Even when the knowledge of the first user US1 regarding the operation of the service providing system 80 is poor, the first user US1 is able to easily add values to the slots. For example, the first information includes the second value. In this way, the first user US1 can add the second value to the first slot, instead of the first value. The accuracy of inferences of the values to be added to the first slot can be improved.

For example, a restaurant serving Chinese food may be opened in the shopping mall. In this case, unless a value for Chinese food is included in the slot S1 illustrated in FIG. 3, the service providing system 80 cannot infer Chinese food in the dialogue. In order to improve the convenience of the service providing system, it is desirable that a new value (new slot parameter) be added to the slot. In this case, a value is added to the slot by the first user US1 that operates the service providing system. In a case where the first user US1 does not have sufficient knowledge, it is difficult to determine whether the value that has been added can be inferred with good accuracy by the dialogue system.

According to the support system 110 or the support method in one embodiment, when the first evaluation value that represents the accuracy of the inference of the first value is low, the first information is transmitted to the operator. By using a program according to one embodiment or a memory medium that stores the program, when the first evaluation value that represents the accuracy of the inference of the first value is low, the first processing unit 21 can be operated so that the first information is transmitted to the operator. This enables an operator to operate the dialogue system more easily.

In the example described above, as the accuracy of the inference of the first value is lower, the first evaluation value becomes lower. As the accuracy of the inference of the first value is higher, the first evaluation value becomes higher. The first evaluation value may also be determined such that as the accuracy of the inference of the first value is lower, the first evaluation value is calculated to be higher. The first evaluation value may also be determined such that as the accuracy of the inference of the first value is higher, the first evaluation value is calculated to be lower.

In other words, for example, in a case where the first evaluation value relating to addition of the first value is in a first state, the first information is transmitted, and in a case where the first evaluation value is in a second state, the first value is added to the dialogue system. In the case where the first evaluation value is in the first state, the possibility that the dialogue system will not be able to appropriately respond in receiving an inquiry that includes the first value is high as compared with the case where the first evaluation value is in the second state.

In the following, a more specific example of the support system 110 will be described.

The support system 110 includes, for example, a first memory unit 41, a second memory unit 42, a third memory unit 43, and a first model memory unit 51.

The first memory unit 41 stores first dialogue data. The first dialogue data includes text that simulates a dialogue. The first dialogue data includes at least one first blank. As an example, the first dialogue data includes text such as "I would like to eat ( )", "tell me a shop of ( )", "tell me a shop that is not ( )", and the like. The ( ) included in the first dialogue data represents the first blank.

The second memory unit 42 stores a plurality of values and a plurality of word vectors. The plurality of word vectors corresponds to the plurality of values.

The third memory unit 43 stores at least one slot that includes the first slot. The plurality of slots each includes at least one value. For example, the third memory unit 43 stores the plurality of slots S1 to Sm as illustrated in FIG. 3.

The first model memory unit 51 stores a first model. The first model includes an input unit and an output unit. The output unit includes a plurality of functions. The plurality of functions relates to the plurality of values. The first model is, for example, a neural network. The plurality of functions corresponds to a plurality of neurons. For example, when a characteristic amount of dialogue data is input to the first model, at least one of the plurality of neurons reacts.

For example, the first memory unit 41, the second memory unit 42, the third memory unit 43, and the first model memory unit 51 may be a HDD or a flash memory.

Figure 5:
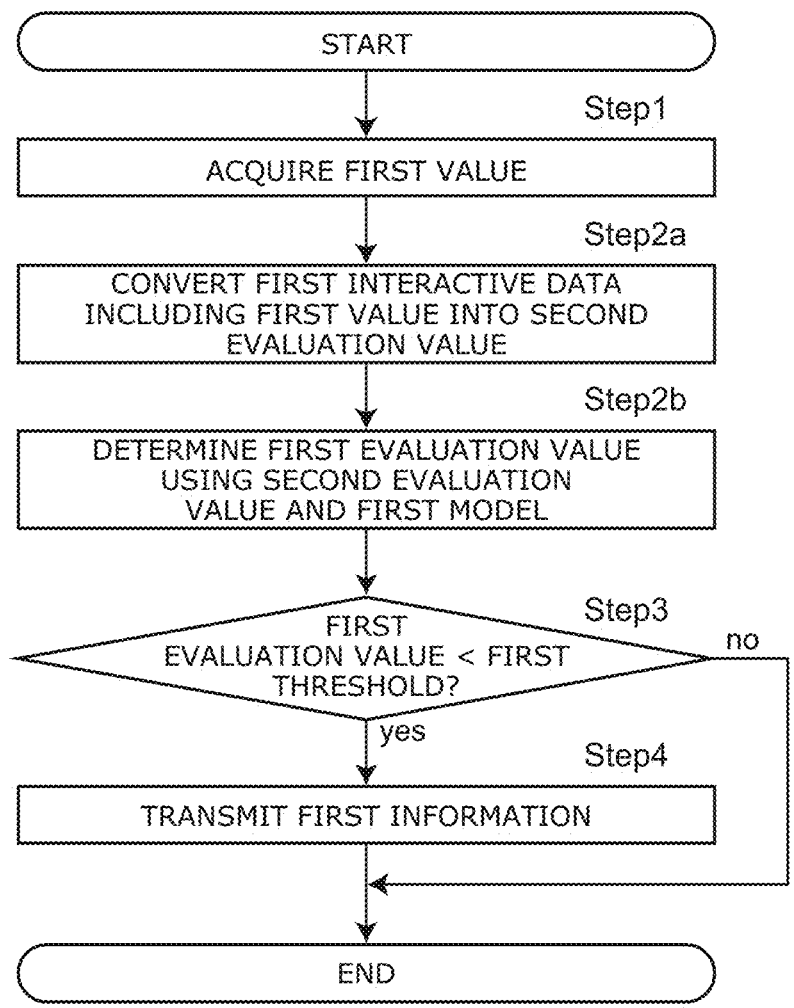
FIG. 5 is a flowchart illustrating an operation of the support system according to the first embodiment.

FIG. 5 is a flowchart illustrating an operation of the support system according to the first embodiment.

The first processing unit 21 includes, for example, a conversion unit 21a, a first determination unit 21b, and a transmission unit 21c.

When the acquiring unit 10 acquires the first value (Step 1), the conversion unit 21a accesses the first memory unit 41. The conversion unit 21a sets the first value in the first blank. As an example, in a case where the first value is "Chinese food", the conversion unit 21a generates first dialogue data "I would like to eat Chinese food". The conversion unit 21a searches through the first memory unit 41, and converts first dialogue data that includes the first value into a second evaluation value (Step 2a). The second evaluation value represents a characteristic of the first dialogue data. The first determination unit 21b refers to the first model memory unit 51. The first processing unit 21 inputs the second evaluation value that represents the characteristic of the first dialogue data into the first model, and determines the first evaluation value based on an output of the first model (Step 2b).

For example, the output unit of the first model includes a first function (first neuron). The first function relates to the first value. For example, the first determination unit 21b inputs the second evaluation value into the first model, and detects an activity level of each of the neurons included in the output unit. For example, the first determination unit 21b determines, as accuracy of the inference, a proportion of the activity level of each neuron with respect to the total activity level. The first determination unit 21b determines, as the first evaluation value, a proportion of the activity level of the first function (output value of the first function) with respect to the total activity level.

As an example, the first value is "Chinese food", and the first function corresponds to the intention "a wish for Chinese food". The first dialogue data that includes the first value is, for example, "I would like to eat Chinese food". In this case, the first dialogue data that includes the first value is input to the first model, and in a case where the output value of the first function is large, it means that the intention of the first dialogue data is correctly inferred.

The transmission unit 21c compares, for example, the first evaluation value with a first threshold value that is set in advance (Step 3). When the first evaluation value is lower than the first threshold value, the transmission unit 21c transmits first information to the first user US1 (Step 4).

When adding the first value to the first slot, the first processing unit 21 may detect a change in the accuracy of the inference of another value included in the first slot. For example, the first slot includes a first existing value before the first value is added. The first processing unit 21 compares first accuracy of an inference of the first existing value in the state in which the first value is added to the first slot, with second accuracy of an inference of the first existing value in the state in which the first value is not included in the first slot. The first information may include a comparison result.

Figure 6:
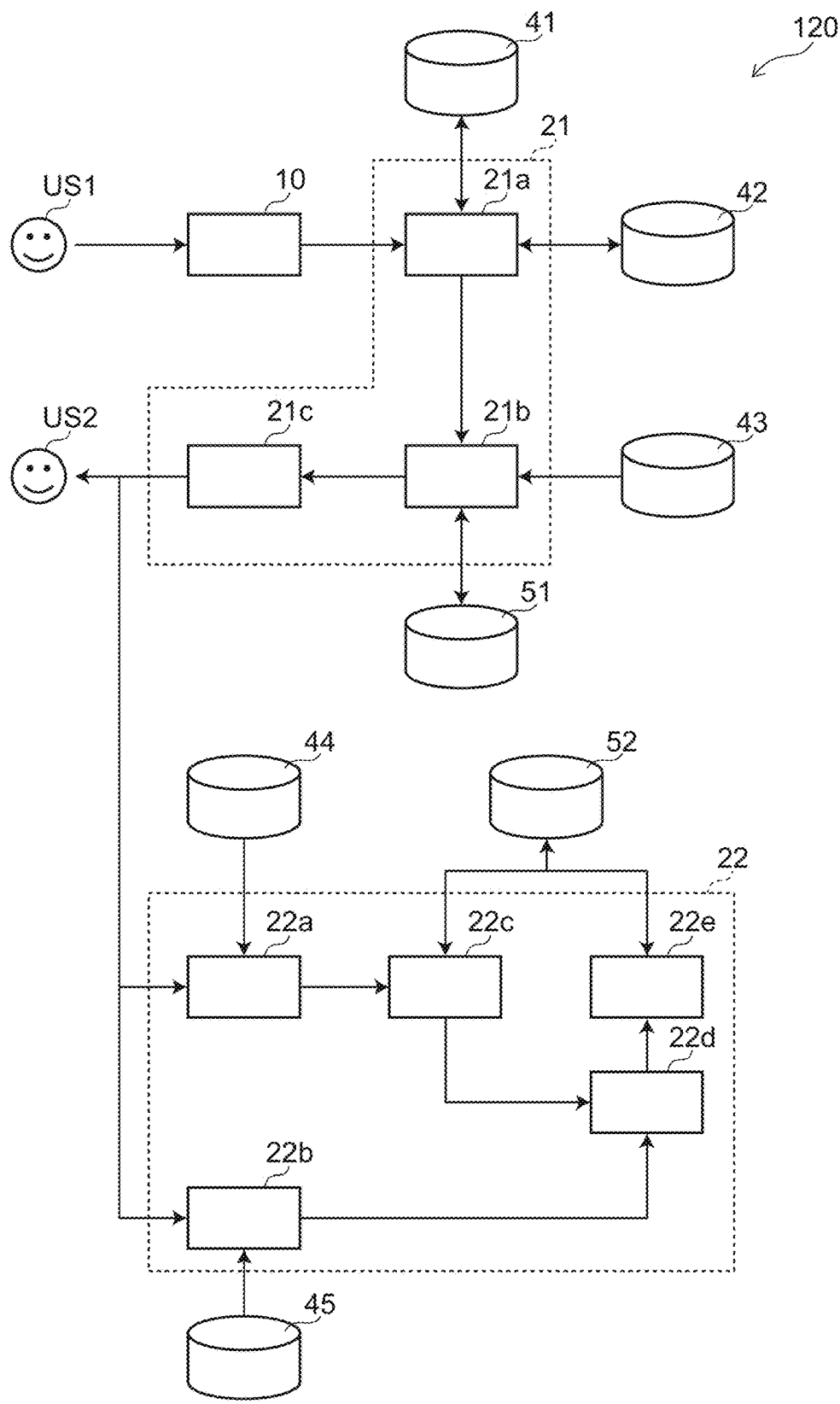
FIG. 6 is a schematic view illustrating another support system according to the first embodiment.

FIG. 6 is a schematic view illustrating another support system according to the first embodiment.

As illustrated in FIG. 6, in a support system 120, when the first evaluation value is low, the first processing unit 21 transmits the second information to the second user US2.

For example, the second information includes the first value and another value included in the first slot. According to the support system 120, the second user US2 is able to re-train a second model, for example, to improve the accuracy of the inference of the first value.

In the example illustrated in FIG. 6, the support system 120 further includes a second processing unit 22, a fourth memory unit 44, a fifth memory unit 45, and a second model memory unit 52. In this example, the first processing unit 21 transmits the first information to the second processing unit 22. The second processing unit 22 re-trains the second model, using the first information.

The fourth memory unit 44 stores second dialogue data. The second dialogue data includes text that simulates a dialogue. The second dialogue data includes at least one second blank. The second dialogue data may be the same as the first dialogue data. As an example, the second dialogue data includes text such as "I would like to eat ( )", "tell me a shop of ( )", "tell me a shop that is not ( )", and the like. The ( ) included in the second dialogue data represents the second blank.

The fifth memory unit 45 stores a first label. The first label indicates an intention of the second dialogue data. As an example, the second dialogue data is "I would like to eat ( )", or "tell me a shop of ( )", the first label is "I want ( )". When the second dialogue data is "tell me a shop that is not ( )", the first label is "( ) is negative". The ( ) included in the first label represents a third blank.

The second model memory unit 52 stores a second model. The second model includes an input unit and an output unit. The output unit includes a plurality of functions. The plurality of functions relates to the plurality of values. The first model stored in the first model memory unit 51 is, for example, a copy of the second model.

Figure 7:
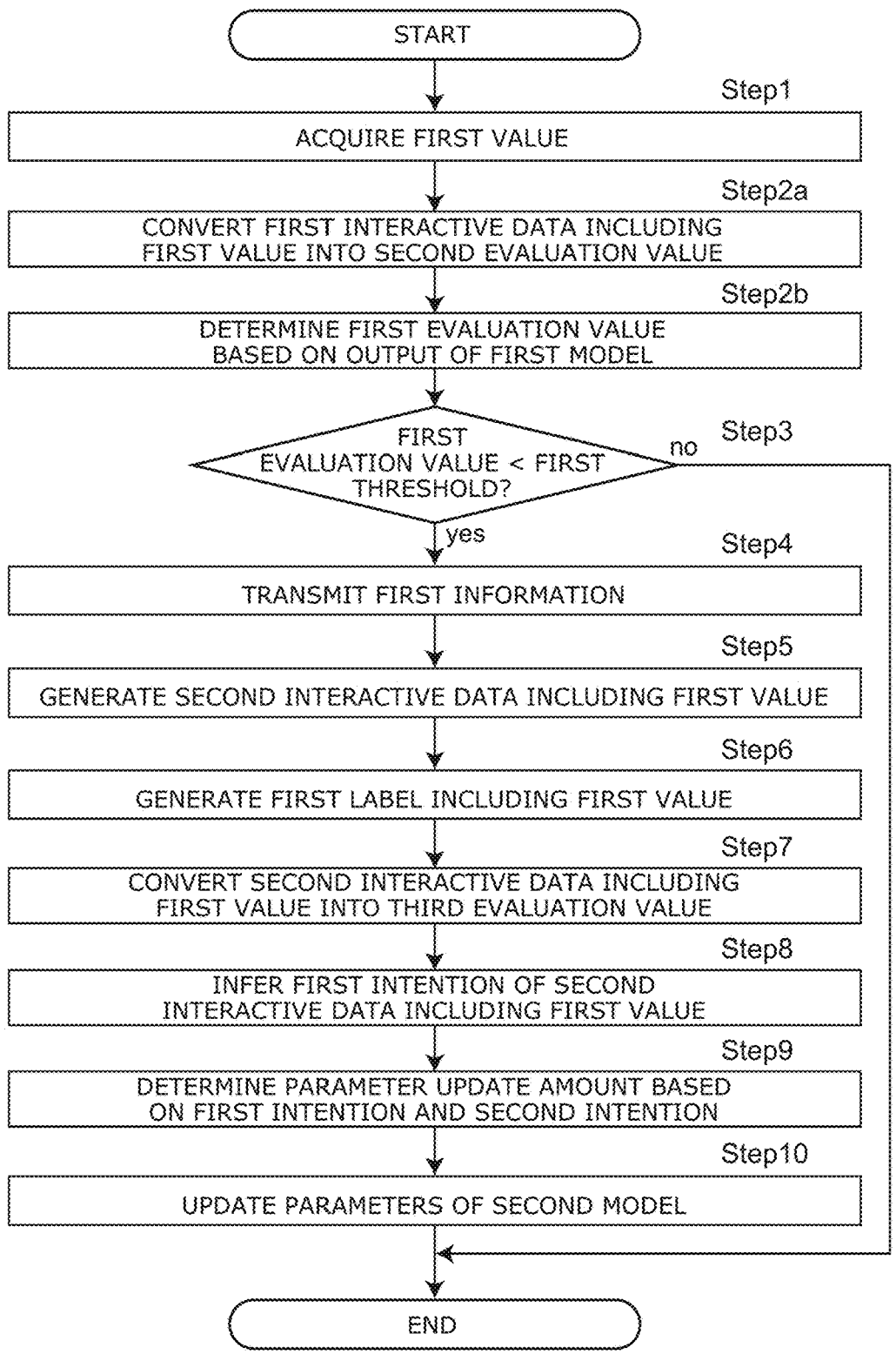
FIG. 7 is a flowchart illustrating an operation of another support system according to the first embodiment.

FIG. 7 is a flowchart illustrating an operation of another support system according to the first embodiment.

The second processing unit 22 includes, for example, a first data generation unit 22a, a second data generation unit 22b, an inference unit 22c, a second determination unit 22d, and an updating unit 22e.

Step 1 to Step 4 in FIG. 7 are, for example, performed in the same manner as Step S1 to Step S4 in FIG. 5.

The first data generation unit 22a receives the first information, and refers to the fourth memory unit 44. The first data generation unit 22a sets the first value in the second blank of the second dialogue data. In this way, the second dialogue data including the first value is generated (Step 5).

The second data generation unit 22b receives the first information, and refers to the fifth memory unit 45. The second data generation unit 22b sets the first value in the third blank of the first label. In this way, the first label including the first value is generated (Step 6).

For example, in a case where the first value is "Chinese food", the first data generation unit 22a sets Chinese food in the second blank. The second data generation unit 22b sets Chinese food in the third blank. In this way, the second dialogue data "I would like to eat Chinese food" and the first label "I want Chinese food" are generated.

The inference unit 22c converts the second dialogue data that includes the first value into a third evaluation value (Step 7). The third evaluation value represents a characteristic of the second dialogue data that includes the first value. The inference unit 22c refers to the second model memory unit 52. The inference unit 22c inputs the third evaluation value into the second model. The inference unit 22c infers a first intention of the second dialogue data that includes the first value, based on the output of the second model (Step 8).

The second determination unit 22d determines a parameter update amount based on the first intention and a second intention (Step 9). The parameter update amount represents the amount by which the parameters of the second model are changed. The parameter update amount is determined so that the first intention approaches the second intention.

As an example, the second dialogue data is "I want to eat Chinese food", and the first label is "I want Chinese food". For example, an inference result of the inference unit 22c based on the second dialogue data is "Chinese food is negative". In this case, the second determination unit 22d determines the parameter update amount so that the inference result becomes the same as the first label "I want Chinese food".

The updating unit 22e updates the parameters of the second model stored in the second model memory unit 52, based on the parameter update amount output from the second determination unit 22d (Step 10).

The second processing unit 22, the fourth memory unit 44, the fifth memory unit 45, and the second model memory unit 52 are possessed by the second user US2, for example. According to the support system 120, when the first information that includes the first value is transmitted to the second user US2, re-training is carried out on the second model. The second user US2 provides the first user US1 with the second model on which re-training (updating of parameters) has been carried out by the second processing unit 22. The accuracy of the inference of the first value can be improved by storing the second model on which re-training has been carried out in the first model memory unit 51, instead of the first model.

Figure 8:
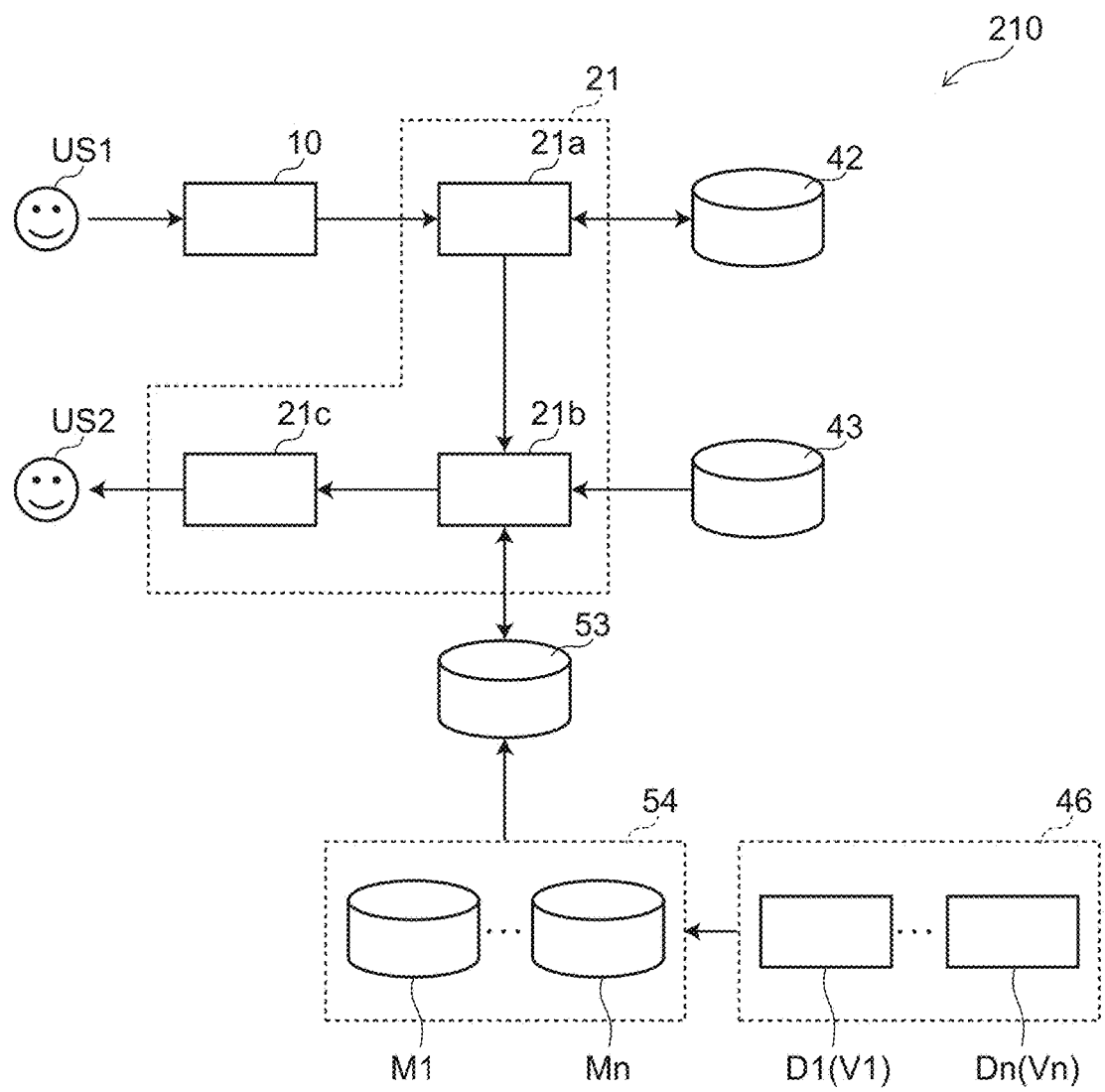
FIG. 8 is a schematic view illustrating a support system according to a second embodiment.

FIG. 8 is a schematic view illustrating a support system according to a second embodiment.

Figure 9:
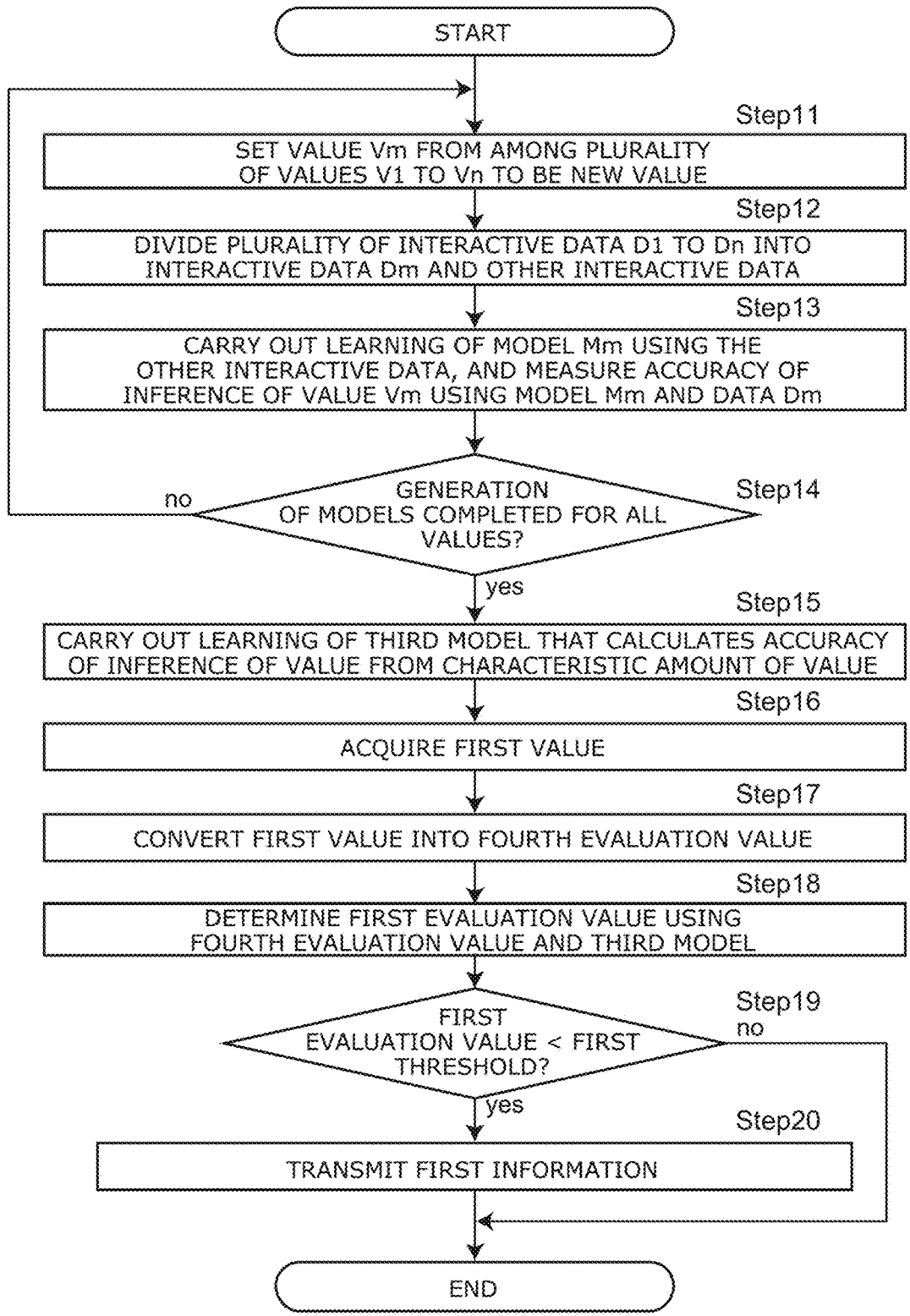
FIG. 9 is a flowchart illustrating the support system according to the second embodiment.

FIG. 9 is a flowchart illustrating the support system according to the second embodiment.

As illustrated in FIG. 8, a support system 210 includes a sixth memory unit 46, a third model memory unit 53, and a fourth model memory unit 54.

The third model memory unit 53 stores a third model that represents a relationship between a value regarding a characteristic of a slot parameter, and a value regarding the accuracy of the inference of the slot parameter. The first determination unit 21b determines the accuracy of the inference of the first value, using the characteristic amount of the first value, and the third model.

The sixth memory unit 46 stores a plurality of dialogue data including the second dialogue data. The plurality of dialogue data D1 to Dn respectively refers to a plurality of values V1 to Vn. The plurality of values V1 to Vn includes a value that is different from the value stored in the third memory unit 43.

The fourth model memory unit 54 stores a plurality of models M1 to Mn including a fourth model. The plurality of models M1 to Mn respectively represents relationships between characteristic amounts of the plurality of dialogue data D1 to Dn, and the plurality of values V1 to Vn.

Training is carried out in advance on the third model, based on, for example, the plurality of dialogue data D1 to Dn. For example, the first processing unit 21 sets a m-th value Vm from the plurality of values V1 to Vn to be a newly added value (Step 11). The plurality of dialogue data D1 to Dn is divided into dialogue data Dm that refers to the value Vm, and the other dialogue data (Step 12). Training of the m-th model Mm is carried out using a fifth evaluation value that represents a characteristic of other dialogue data. The accuracy of an inference of the value Vm is measured using the model Mm and the dialogue data Dm (Step 13). A determination is made on whether models for all of the plurality of values V1 to Vn are created (Step 14).

In a case where models for all of the plurality of values V1 to Vn are created, the accuracy of an inference of each of the plurality of values V1 to Vn in the process so far is measured. The third model is trained so as to calculate the plurality of accuracies as described above, from the plurality of characteristic amounts of the values V1 to Vn (Step 15).

For example, the acquiring unit 10 acquires the first value added to the first slot, based on an input by the first user US1 (Step 16). The conversion unit 21a refers to the second memory unit 42, and converts the first value into a fourth evaluation value (Step 17). The fourth evaluation value represents a characteristic of the first value. The first determination unit 21b determines the first evaluation value that represents the accuracy of the inference of the first value, using the fourth evaluation value and the third model (Step 18). The transmission unit 21c compares the first evaluation value with the first threshold value (Step 19). When the first evaluation value is lower than the first threshold value, the transmission unit 21c transmits first information to the first user US1 (Step 20).

In the support system 210 according to the second embodiment, the first evaluation value is determined using the third value and the third model. Therefore, the first evaluation value can be determined in a shorter period of time than the period by the support system 110 according to the first embodiment.

In the support system 210 according to the second embodiment, the first information may be transmitted to the second user US2, in the same manner as for the support system 120. The support system 120 may further include the second processing unit 22, the fourth memory unit 44, the fifth memory unit 45, and the second model memory unit 52, in the same manner as for the support system 120.

According to each of the embodiments as described above, a support system that simplifies an operation of a dialogue system, a support method, a program, and a memory medium are provided.

The embodiments may include the following configurations.
Configuration 1
A support system comprising:
an acquiring unit configured to acquire a new slot parameter to be added to a dialogue system by a first user; and
a first processing unit configured to transmit to the first user first information that includes the new slot parameter, when it is inferred that it is not possible to appropriately respond to an inquiry that includes the slot parameter when the dialogue system is used.
Configuration 2
A support method, for adding a new slot parameter, for use in a dialogue system, the support method comprising:
acquiring a new slot parameter to be added to the dialogue system; and
transmitting first information that includes the new slot parameter to an operator of the dialogue system, based on a first evaluation value for selecting the new slot parameter.
Configuration 3

A memory medium for storing a program that causes a first processing unit to:
acquire a new slot parameter to be added to a dialogue system; and
transmit first information that includes the new slot parameter to an operator of the dialogue system, based on a first evaluation value for selecting the new slot parameter.

Hereinabove, embodiments of the invention are described with reference to specific examples. However, the invention is not limited to these specific examples. For example, one skilled in the art may similarly practice the invention by appropriately selecting specific configurations of components such as the acquiring unit, the processing unit, the output unit, the memory units, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all support systems, all support methods, all programs, and all memory mediums practicable by an appropriate design modification by one skilled in the art based on the support systems, the support methods, the programs, and the memory mediums described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A support system, for adding a new slot parameter, for use in a dialogue system, the support system comprising:
a user input device configured to receive user input corresponding to a new slot parameter to be added to the dialogue system; and
a first processor configured to generate first dialogue data comprising the new slot parameter, and transmit first information that includes the new slot parameter to an operator of the dialogue system, based at least in part on a comparison between a threshold value and a first evaluation value for selecting the new slot parameter, wherein the first evaluation value is determined by inputting a second evaluation value that represents a characteristic of the first dialogue data into a first model stored in a model memory.

2. A support system comprising:
a user input device configured to receive input corresponding to a first slot parameter to be added to a dialogue system including an existing slot parameter; and a first processor configured to transmit first information that includes the first slot parameter and a second slot parameter as a candidate alternative to the first slot parameter to a first operator of the dialogue system when a first evaluation value regarding addition of the first slot parameter is in a first state, and to add the first slot parameter to the dialogue system when the first evaluation value is in a second state that is different from the first state.

3. The support system according to claim 2, wherein the first processor is further configured to transmit second information that includes the existing slot parameter and the first slot parameter to a second operator of the dialogue system, when the first evaluation value is in the first state.

4. A support system comprising:
   a user input device configured to receive user input corresponding to a first slot parameter to be added to a dialogue system including an existing slot parameter; and
   a first processor configured to transmit information that includes the existing slot parameter and the first slot parameter when a first evaluation value regarding addition of the first slot parameter is in a first state, and to add the first slot parameter to the dialogue system when the first evaluation value is in a second state that is different from the first state.

5. The support system according to claim 4, wherein the dialogue system includes a first classification that includes the existing slot parameter, and the first processor adds the first slot parameter to be added to the first classification when the first evaluation value is in the second state.

6. The support system according to claim 1, wherein the first processor is further configured to:
   set the first slot parameter in the first dialogue data;
   refer to the first model that includes a first function regarding the first slot parameter in an output unit;
   input into the first model the second evaluation value that represents the characteristic of the first dialogue data that includes the first slot parameter; and
   determine the first evaluation value based on an output of the first function.

7. The support system according to claim 6, further comprising a second processor, wherein the second processor is configured to:
   set the first slot parameter in second dialogue data and a first label;
   input into an input unit of a second model a third evaluation value that represents a characteristic of the second dialogue data that includes the first slot parameter; and
   change a slot parameter included in the second model so that a second intention to be output from the second model agrees with a first intention indicated by the first label.

8. The support system according to claim 1, wherein the first processor is configured to generate a fourth evaluation value that represents a characteristic of the first slot parameter, and to determine the first evaluation value based on the fourth evaluation value.

9. The support system according to claim 8, wherein the first processor is further configured to:
   generate the fourth evaluation value based on a word vector corresponding to the first slot parameter;
   input the fourth evaluation value into an input unit of a third model; and
   determine the first evaluation value based on an output of the third model.

10. The support system according to claim 9, wherein the first processor is further configured to:
    cause a fourth model to train using third dialogue data relating to a third slot parameter;
    input into the fourth model fourth dialogue data that includes the first slot parameter;
    determine a fifth evaluation value based on an output of the fourth model;
    cause the third model to train using a value that represents a characteristic of the first slot parameter and the fifth evaluation value;
    input the fourth evaluation value to the third model that has been caused to train; and
    determine the first evaluation value based on the output of the third model.

11. The support system according to claim 1, wherein the first processor is configured to detect a change in accuracy of an inference of the existing slot parameter when the first slot parameter is added.

12. A support system, for adding a new slot parameter, for use in a dialogue system, the support system comprising:
    a user input device configured to receive user input corresponding to a first new slot parameter to be added by a first user; and
    a processor configured to generate first dialogue data comprising the first new slot parameter, determine a first evaluation value that represents accuracy of an evaluation of the first new slot parameter and a second evaluation value that represents a characteristic of the first dialogue data, and transmit first information to the first user when the first evaluation value is lower than a threshold value.

13. The support system according to claim 12, wherein the first information includes a second new slot parameter as a candidate alternative to the first new slot parameter.

* * * * *